(No Model.)
R. W. & T. J. CAVE.
WASHER FOR WHEEL SPOKES.
No. 493,397. Patented Mar. 14, 1893.
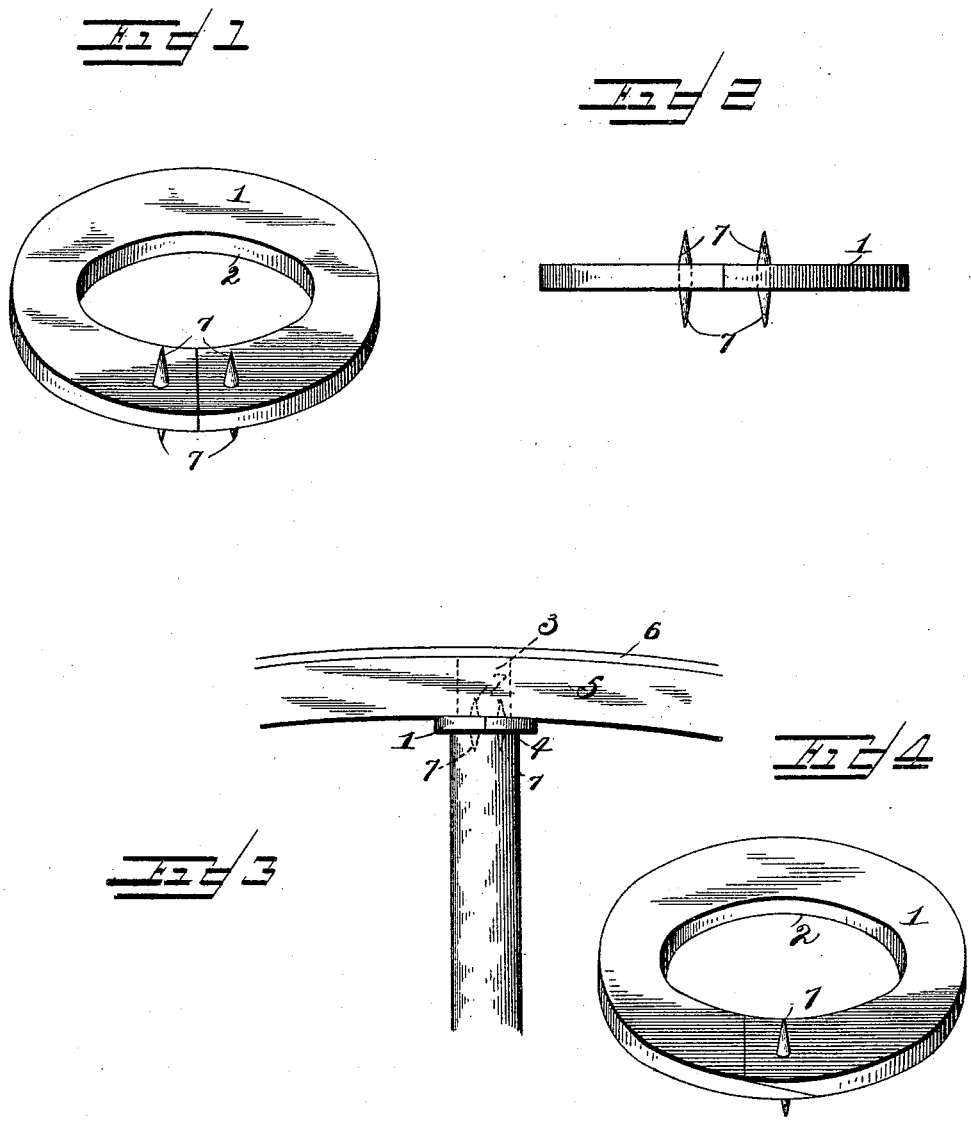
Witnesses
W. O. Schneider
N. J. Riley
Inventors
R. W. Cave.
T. J. Cave.
By their Attorneys,
C. A. Snow & Co.

UNITED STATES PATENT OFFICE.

ROBERT W. CAVE AND THOMAS J. CAVE, OF PRICEVILLE, KENTUCKY.

WASHER FOR WHEEL-SPOKES.

SPECIFICATION forming part of Letters Patent No. 493,397, dated March 14, 1893.

Application filed October 17, 1892. Serial No. 449,054. (No model.)

*To all whom it may concern:*

Be it known that we, ROBERT W. CAVE and THOMAS J. CAVE, citizens of the United States, residing at Priceville, in the county of Hart and State of Kentucky, have invented a new and useful Washer for Spokes, of which the following is a specification.

The invention relates to improvements in washers.

The object of the present invention is to provide a washer adapted to be interposed between the felly of a wheel and the shoulder of a spoke, and disposed on the tenon to force the felly outward to tighten the tire.

A further object of the invention is to enable the washer to be readily applied to a wheel when the latter has become loose, and to be securely retained in position when applied.

The invention consists in the construction and novel combination and arrangement of parts hereinafter fully described, illustrated in the accompanying drawings and pointed out in the claims hereto appended.

In the drawings—Figure 1 is a perspective view of a washer constructed in accordance with this invention. Fig. 2 is an elevation of the same. Fig. 3 is an elevation of a portion of a wheel showing the washer applied thereto. Fig. 4 is a perspective view of a washer detached showing the preferred form.

Like numerals of reference indicate corresponding parts in all the figures of the drawings.

1 designates a circular washer constructed of flexible material such as leather, or similar material and having a central opening 2 adapted to receive the tenon of a spoke 3 and to be interposed between the shoulder 4 and a felly 5 to force the latter tightly against a tire 6 to tighten the latter. The washer is provided with a radial kerf or split, whereby when the felly is forced outward away from the shoulder of the spoke by any suitable instrument, the washer may be sprung around the tenon.

In order to hold the severed ends of the washer together and to secure the washer in place the latter is provided adjacent to the severed ends with pins 7 which pass through the washer and project from both faces thereof, and are pointed to form spurs to be embedded in the shoulder of the spoke and in the felly. By this construction the severed ends of the washer are held together and the washer is securely fastened in position.

In Fig. 4 is illustrated the preferred form of washer and in this form the radially severed ends 8 are cut on an incline to form correspondingly beveled ends which are adapted to fit together to provide a continuous unbroken washer when in position. The severed ends are secured together when the washer is in position by a vertical pin 9 similar in construction to the pins 7 and passing through the beveled ends 8 and projecting from the upper and lower faces of the washer to form points to be inserted in the wood of the felly and the spoke. By this construction the severed ends are positively secured together and overlap and provide a washer of the same thickness throughout its length.

We are aware that split washers have been employed to tighten the tire of a wheel, and that pins or spurs have been employed for holding the washers in place, but we are not aware that a washer has been employed having a radial split or kerf and provided on both its faces at its severed ends with a spur for holding the washer in place and securing the ends together.

What we claim is—

1. A circular washer having a central tenon receiving opening and provided with a radial split or kerf forming severed ends and having its severed ends arranged together and provided with a pin passing through the washer adjacent to the ends thereof and securing the washer in places and projecting from the upper and lower faces of the washer, substantially as described.

2. A circular washer constructed of flexible material and having a central opening and provided with an inclined radial split or kerf forming beveled ends overlapping each other and provided with a pin passing through the overlapped ends and securing the same together and projecting from the upper and lower faces of the washer and forming spurs, substantially as described.

In testimony that we claim the foregoing as our own we have hereto affixed our signatures in the presence of two witnesses.

ROBERT W. CAVE.
THOMAS J. CAVE.

Witnesses:
W. P. CORDEN, Jr.,
J. W. FITZPATRICK.